United States Patent
Furman et al.

(10) Patent No.: US 7,693,239 B2
(45) Date of Patent: Apr. 6, 2010

(54) APPARATUS FOR DECODING CONVOLUTIONAL CODES AND ASSOCIATED METHOD

(75) Inventors: William N. Furman, Fairport, NY (US); John W. Nieto, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 854 days.

(21) Appl. No.: 11/349,597

(22) Filed: Feb. 8, 2006

(65) Prior Publication Data

US 2007/0201584 A1    Aug. 30, 2007

(51) Int. Cl.
*H04L 27/06* (2006.01)
(52) U.S. Cl. ...................................... 375/341
(58) Field of Classification Search ................. 375/147, 375/260, 267, 340, 341; 714/794
See application file for complete search history.

(56) References Cited

U.S. PATENT DOCUMENTS

| | | | |
|---|---|---|---|
| 4,853,930 A | 8/1989 | Shimada | 371/43 |
| 5,329,536 A | 7/1994 | Darmon et al. | 371/43 |
| 5,602,961 A | 2/1997 | Kolesnik et al. | 395/2.32 |
| 5,729,655 A | 3/1998 | Kolesnik et al. | 395/2.32 |
| 6,307,899 B1 | 10/2001 | Starr et al. | 375/340 |
| 6,345,073 B1 | 2/2002 | Curry et al. | 375/265 |
| 6,484,285 B1 | 11/2002 | Dent | 714/791 |
| 6,690,752 B2 | 2/2004 | Beerel et al. | 375/341 |
| 6,728,322 B1 | 4/2004 | Asai et al. | 375/340 |
| 6,801,588 B1 | 10/2004 | Yamaguchi | 375/341 |
| 6,831,574 B1 | 12/2004 | Mills et al. | 341/50 |
| 6,842,487 B1 | 1/2005 | Larsson | 375/260 |
| 6,851,083 B1 | 2/2005 | Hagenauer et al. | 714/774 |
| 6,888,900 B2 | 5/2005 | Starr et al. | 375/340 |
| 6,889,354 B2 | 5/2005 | Feldman et al. | 714/791 |
| 2003/0031236 A1* | 2/2003 | Dahlman et al. | 375/147 |
| 2004/0153957 A1 | 8/2004 | Feldman et al. | 714/795 |
| 2004/0213360 A1 | 10/2004 | McElwain | 375/340 |
| 2005/0018793 A1 | 1/2005 | Learned | 375/340 |
| 2005/0053173 A1 | 3/2005 | Egnor et al. | 375/341 |
| 2005/0185729 A1* | 8/2005 | Mills | 375/267 |
| 2006/0026493 A1* | 2/2006 | Cherubini et al. | 714/794 |
| 2006/0093026 A1* | 5/2006 | Montojo et al. | 375/225 |

* cited by examiner

*Primary Examiner*—David C Payne
*Assistant Examiner*—Leon-Viet Q Nguyen
(74) *Attorney, Agent, or Firm*—Allen, Dyer, Doppelt, Milbrath & Gilchrist, P.A.

(57) ABSTRACT

A decoding device may include a sequential convolutional code decoder, and a parallel convolutional code decoder. The decoding device may further include a controller for selectively processing a convolutionally encoded input signal via at least one of the sequential convolutional code decoder and the parallel convolutional code decoder. The selection of decoder may be based upon a signal-to-noise ratio or the passage of time, for example.

13 Claims, 7 Drawing Sheets

| SNR | VITERBI K=7 | FANO K=7 | VITERBI K=32 est | FANO K=32 |
|---|---|---|---|---|
| -10 | 1 | 1.4 | 33.5M | 1.5 |
| -5 | 1 | 1/30 | 33.5M | 1/26 |
| 0 | 1 | 1/32 | 33.5M | 1/30 |
| 10 | 1 | 1/32 | 33.5M | 1/30 |

FIG. 7

APPARATUS FOR DECODING CONVOLUTIONAL CODES AND ASSOCIATED METHOD

FIELD OF THE INVENTION

The invention relates to the field of communications, and, more particularly, to decoding signals and related methods.

BACKGROUND OF THE INVENTION

Telecommunication system users are demanding higher and higher data rates from their telecommunications devices. Under such circumstances, telecommunications devices using convolutional coding for error control have increased computational complexity. To address this problem, several known methods have attempted to reduce the computational complexity of decoding convolutional codes in a telecommunications device.

For example, U.S. Pat. Nos. 6,888,900 and 6,307,899 to Starr et al. each discloses a system for optimizing gain in a convolutional sequential decoder or a Viterbi decoder. The system includes a signal-to-noise ratio (SNR) monitor used for adjusting the size of a variable length input buffer and/or a variable length backsearch buffer.

U.S. Pat. No. 6,690,752 to Beerel et al. discloses a sequential decoding system including a controller connected to a sequential decoder and a signal-to-noise ratio (SNR) based switch. The controller uses the SNR to adjust the voltage level and the clock frequency of the sequential decoder. U.S. Pat. No. 6,728,322 to Asai et al. also discloses a sequential decoder system. The system includes a controller connected to a sequential decoder and a switch used to enable a tracking mode. In addition, U.S. Pat. No. 6,345,073 to Curry et al. discloses a convolutional despreading method that uses a Viterbi or Fano convolution search technique.

Unfortunately, despite such developments in convolutional decoding systems, there still exists a need for a more efficient convolutional decoder than is presently available.

SUMMARY OF THE INVENTION

In view of the foregoing background, it is therefore an object of the invention to provide a more efficient convolutional decoder.

This and other objects, features, and advantages in accordance with the invention are provided by a decoding device that may include a sequential convolutional code decoder and a parallel convolutional code decoder. The decoding device may further include a controller for selectively processing a convolutionally encoded input signal via at least one of the sequential convolutional code decoder and the parallel convolutional code decoder. Accordingly, a convolutional decoder that reduces the average decoding time of a convolutionally encoded input signal may be provided.

In one class of embodiments, the controller may determine a signal-to-noise ratio (SNR) of the convolutionally encoded input signal, and process the convolutionally encoded input signal via the sequential convolutional code decoder if the SNR is above an SNR threshold, or process the convolutionally encoded input signal via the parallel convolutional code decoder if the SNR is below the SNR threshold. The controller may also determine the SNR threshold based upon a modulation type and/or the code rate of the convolutionally encoded input signal.

In an alternative class of embodiments, the controller may initially process the convolutionally encoded input signal via the sequential convolutional code decoder, and after a threshold time thereafter, process the convolutionally encoded input signal via the parallel convolutional code decoder. The parallel convolutional code decoder may use partially decoded data produced by the sequential convolutional code decoder. Alternatively, the parallel convolutional code decoder may not use the partially decoded data from the sequential convolutional code decoder.

The sequential convolutional code decoder may comprise a Fano decoder, for example. The parallel convolutional code decoder may comprise a Viterbi decoder, for example. The sequential convolutional code decoder may have a first constraint length, and the parallel convolutional code decoder may have a second constraint length equal to the first constraint length. The first and second constraint lengths may be less than about 10, for example.

A method aspect of the invention may be for decoding a convolutionally encoded input signal using a decoding device comprising a sequential convolutional code decoder, a parallel convolutional code decoder, and a controller connected to the sequential convolutional code decoder and the parallel convolutional code decoder. The method may comprise operating the controller to selectively process the convolutionally encoded input signal via at least one of the sequential convolutional code decoder and the parallel convolutional code decoder.

BRIEF DESCRIPTION OF THE DRAWINGS

FIG. 7 is a table showing results from a simulation of the decoding device of FIG. 1.

DETAILED DESCRIPTION OF THE PREFERRED EMBODIMENTS

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime and multiple prime notation is used to indicate similar elements in alternative embodiments.

Figure 1:
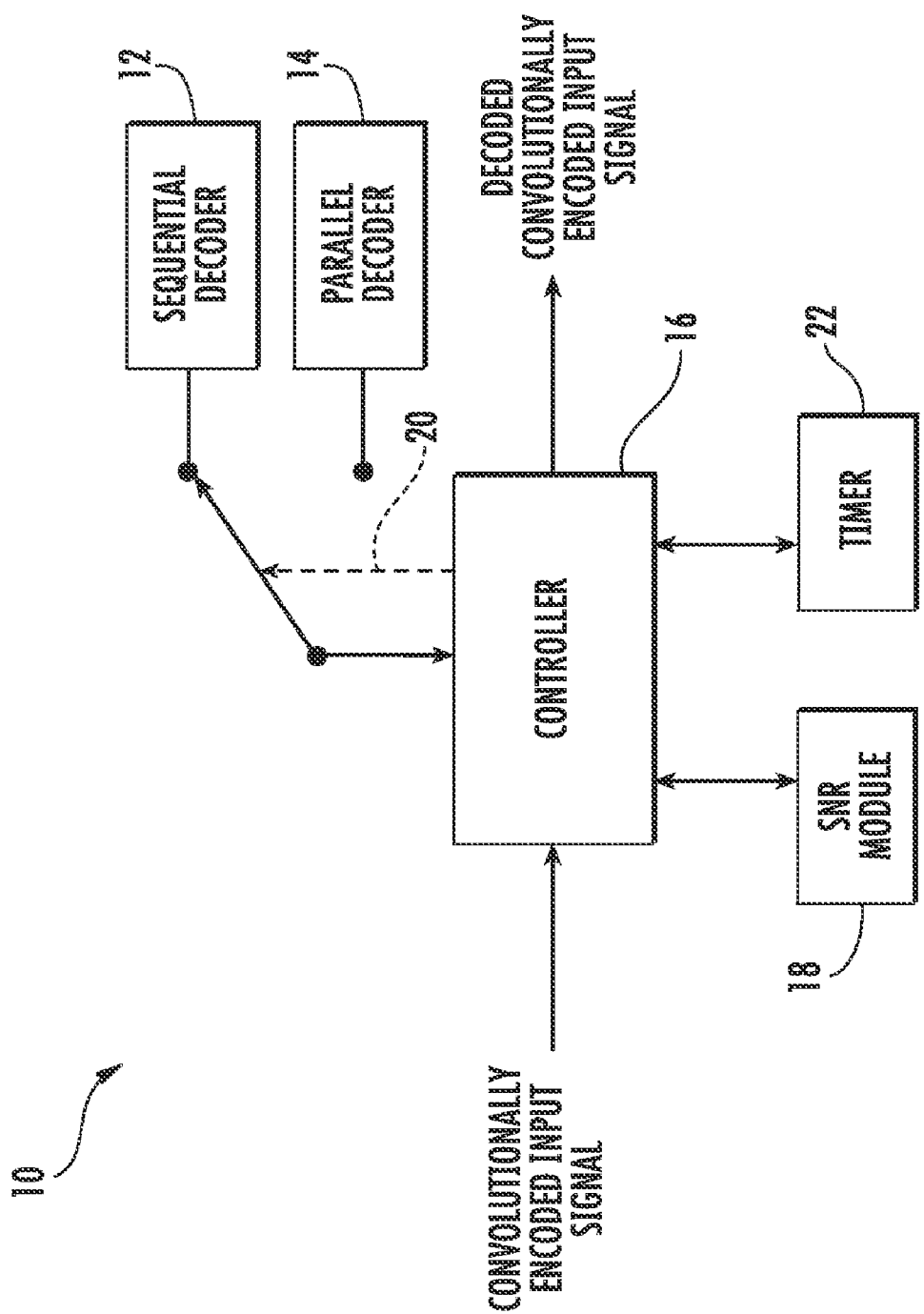
FIG. 1 is a schematic block diagram of a decoding device according to the invention.

Referring initially to FIG. 1, a decoding device 10 for decoding convolutional codes is now described. The decoding device 10 includes a sequential convolutional code decoder 12 and a parallel convolutional code decoder 14. The sequential convolutional code decoder 12 may comprise a Fano decoder, and the parallel convolutional code decoder 14 may comprise a Viterbi decoder, for example.

As will be appreciated by those of skill in the art, the sequential convolutional code decoder 12 has a first constraint length, and the parallel convolutional code decoder 14 has a second constraint length. The second constraint length may be equal to the first constraint length, for example. The first and second constraint lengths may each be less than about 10.

The decoding device 10 further includes a controller 16 for selectively processing a convolutionally encoded input signal via at least one of the sequential convolutional code decoder 12 and the parallel convolutional code decoder 14. The controller 16 selects the sequential convolutional code decoder 12 or the parallel convolutional code decoder 14 via the schematically illustrated switch 20 as will be appreciated by those of skill in the art. Furthermore, the controller is connected to, and cooperates with, either a signal-to-noise ratio (SNR) module 18 and a timer 22 as will be described in greater detail below.

Figure 2:
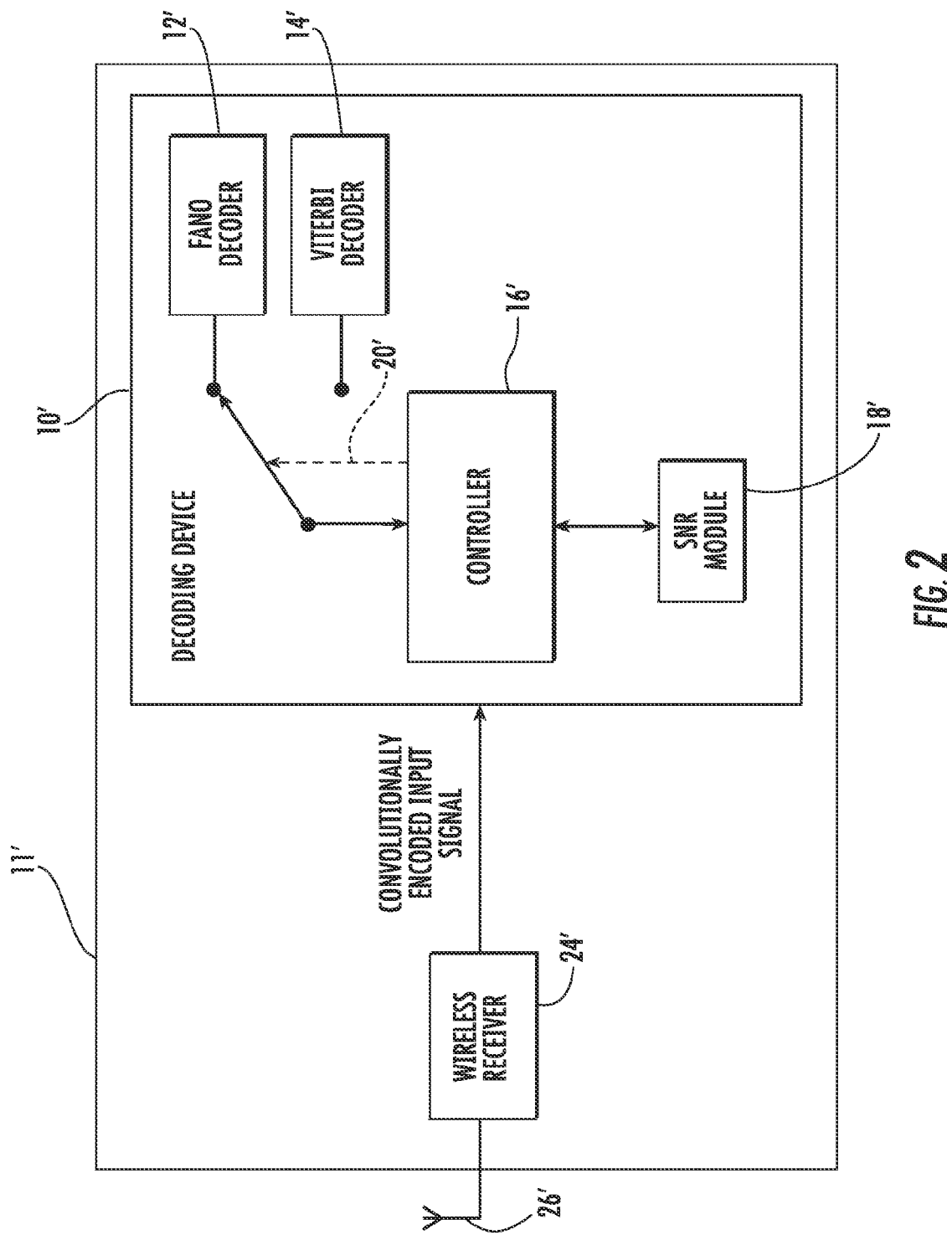
FIG. 2 is a schematic block diagram of a first class of embodiments of a convolutional decoding system using the decoding device shown in FIG. 1.

Referring now additionally to FIG. 2, a first class of embodiments using the decoding device 10' is now described. An electronic device 11' includes a wireless receiver 24' cooperating with the decoding device 10' as will be appreciated by those of skill in the art. The wireless receiver 24' is connected to an antenna 26' for receiving the convolutionally encoded input signal from a communication network. The electronic device 11' also includes the SNR module 18' cooperating with the controller 16', the switch 20', a Fano decoder 12', and a Viterbi decoder 14' to decode the convolutionally encoded input signal. The Fano decoder 12' is an illustrative example of a sequential decoder 12 and the Viterbi decoder 14' is an illustrative example of a parallel decoder 14. As will be appreciated by those of skill in the art, other types of sequential and parallel decoders may also be used.

Figure 3:
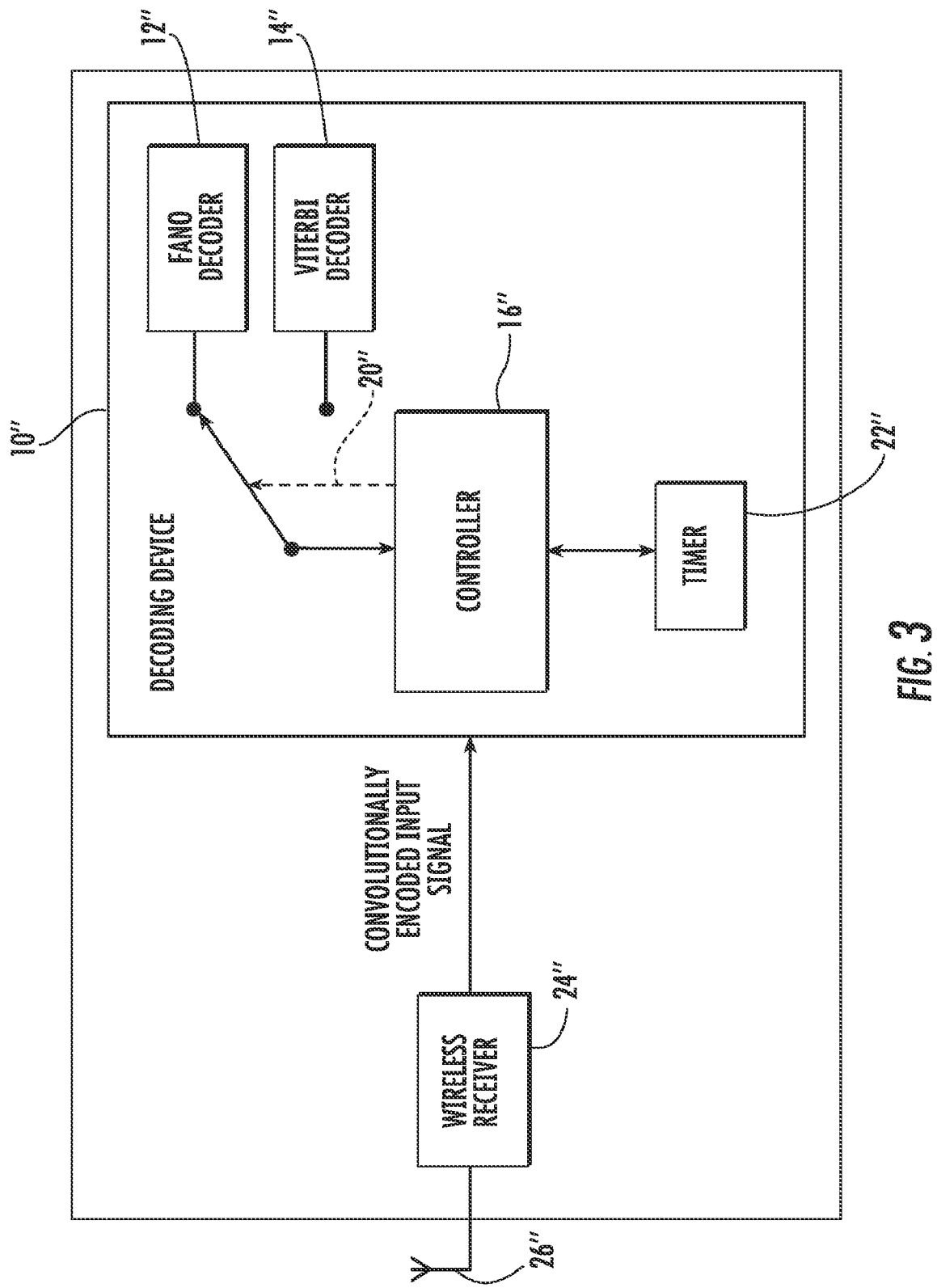
FIG. 3 is a schematic block diagram of a second class of embodiments of a convolutional decoding system using the decoding device shown in FIG. 1.

FIG. 3 illustrates a second class of embodiments using the decoding device 10". In this class of embodiments, the electronic device 11" includes the timer 22" cooperating with the controller 16", the switch 20", the Fano decoder 12", and the Viterbi decoder 14" to decode the convolutionally encoded input signal.

Figure 4:
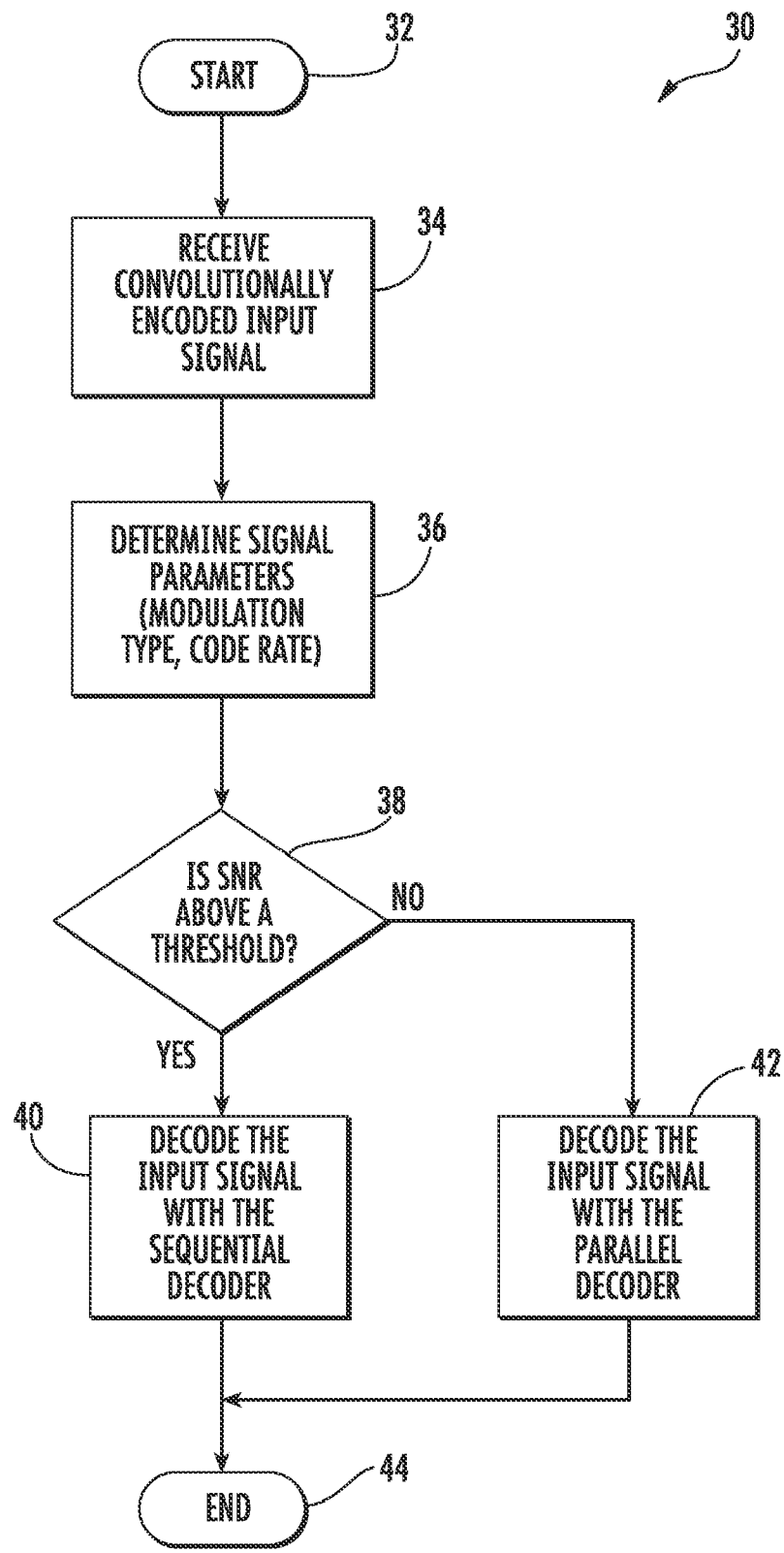
FIG. 4 is a flow chart illustrating the operation of a first embodiment of the first class of embodiments of the convolutional decoding system shown in FIG. 2.

With additional reference to the flowchart 30 of FIG. 4, the operation of the first class of embodiments of the decoding device 10' is now described. The operation starts at Block 32, and the decoding device 10' receives a convolutionally encoded input signal at Block 34. The decoding device 10' determines an SNR of the convolutionally encoded input signal by using the SNR module 18' as will be appreciated by those of skill in the art. The decoding device 10' may determine the SNR based upon a modulation type, the code rate, or the like at Block 36.

The decoding device 10' determines if the SNR is above an SNR threshold at Block 38. If the SNR is above the SNR threshold, the decoding device 10' processes the convolutionally encoded input signal via the sequential convolutional code decoder 12' at Block 40. If the SNR is below the SNR threshold, the decoding device 10' processes the convolutionally encoded input signal via the parallel convolutional code decoder 14' at Block 42. The operation ends at Block 44. In other words, the decoding device 10' selects the code decoder that is the most efficient for a given SNR thereby enabling the decoding device 10' to decode a convolutionally encoded input signal more efficiently than a conventional convolutional decoder.

Figure 5:
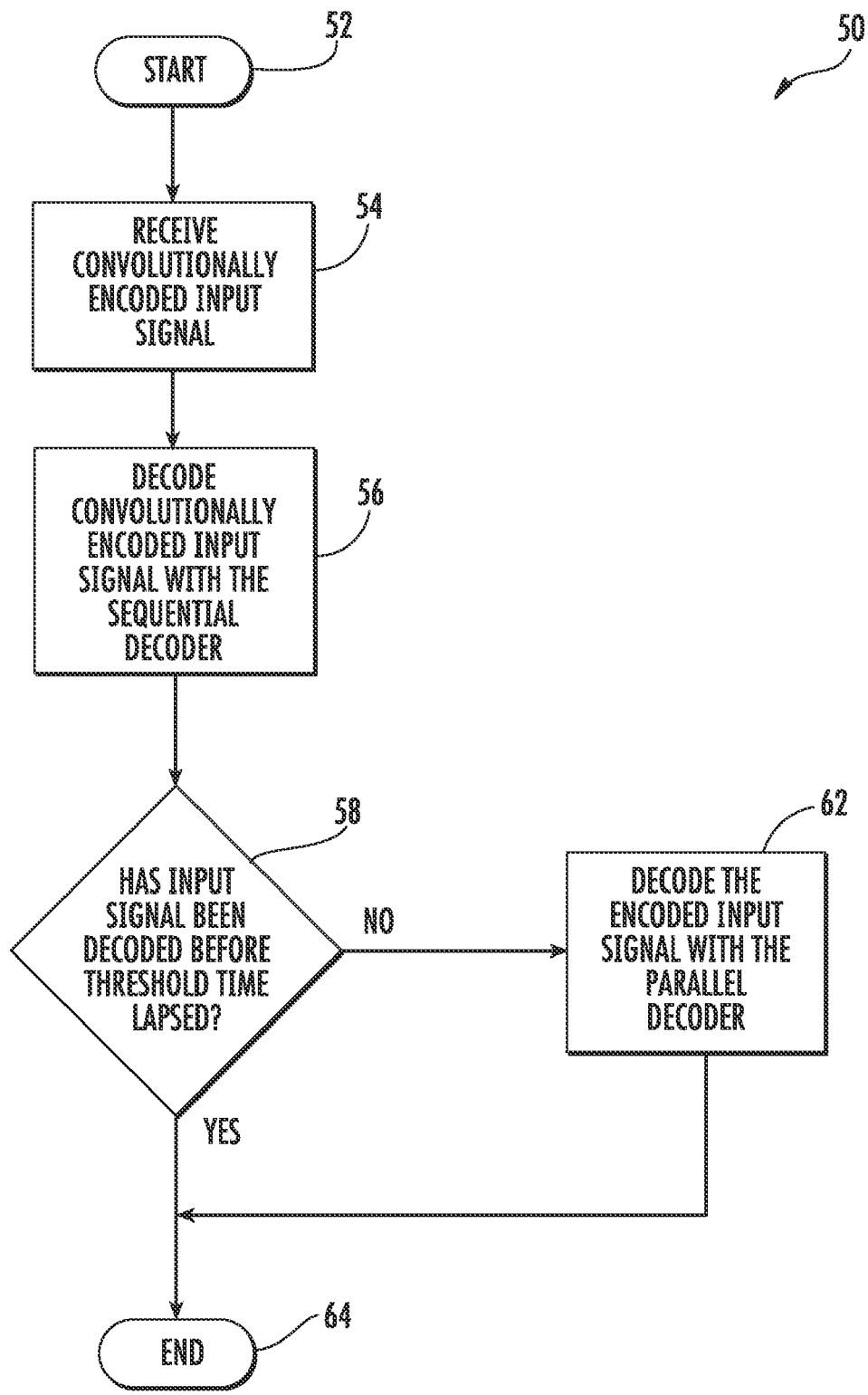
FIG. 5 is a flow chart illustrating the operation of a second embodiment of the first class of embodiments of the convolutional decoding system shown in FIG. 2.
Figure 6:
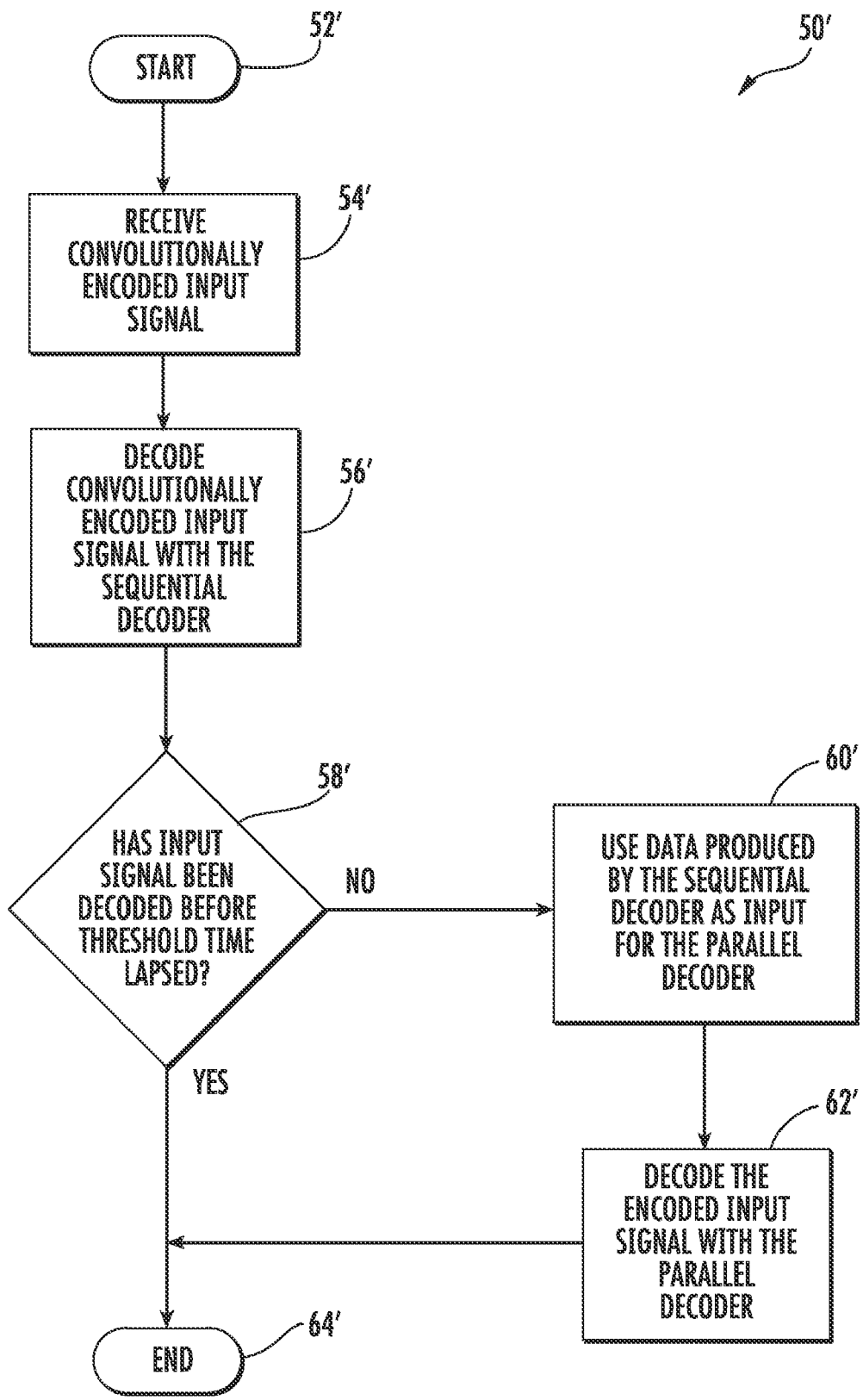
FIG. 6 is a flow chart illustrating the operation of the second class of embodiments of the convolutional decoding system shown in FIG. 3.

With additional reference to flowcharts 50 and 50' of FIGS. 5 and 6, the operation of the second class of embodiments of the decoding device 10" is now described. The operation starts at Block 52, 52', and the decoding device 10" receives a convolutionally encoded input signal at Block 54, 54'. The decoding device 10" initially processes the convolutionally encoded input signal via the sequential convolutional code decoder 12" at Block 56, 56' until a threshold time has lapsed. When the threshold time lapses, the decoding device 10" determines if the convolutionally encoded input signal has been decoded at Block 58, 58'. If the convolutionally encoded input signal has been decoded, then the operation ends at Block 64, 64'. As shown in the flowchart 50 of FIG. 5, if the convolutionally encoded input signal has not been decoded in time, then the decoding device 10" processes the convolutionally encoded input signal via the parallel convolutional code decoder 14" at Block 62. Again, the result is a more efficient convolutional decoder than a conventional convolutional decoder.

Optionally, and as shown in the flowchart 50' of FIG. 6, if the convolutionally encoded input signal has not been decoded at Block 58', the parallel convolutional code decoder 14" may use partially decoded data produced by the sequential convolutional code decoder 12" as an input at Block 60', and the decoding device 10" finishes decoding the convolutionally encoded input signal via the parallel convolutional code decoder 14" at Block 62'.

Simulated values generated by the decoding device 10 are shown in FIG. 7 where the simulations were normalized to a Viterbi decoder with k=7 and 10 dB. As can be seen, a Fano decoder where k=7 is approximately 30 times faster for all but the lowest SNR. It can also be seen that a Viterbi decoder where k=32 would require 33.5 million times the calculations of the same Viterbi decoder where k=7.

A method aspect of the invention is for decoding a convolutionally encoded input signal using a decoding device 10 comprising a sequential convolutional code decoder 12, a parallel convolutional code decoder 14, and a controller 16 connected to the sequential convolutional code decoder and the parallel convolutional code decoder. The method comprises operating the controller 16 to selectively process the convolutionally encoded input signal via at least one of the sequential convolutional code decoder 12 and the parallel convolutional code decoder 14.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A decoding device comprising:
   a sequential convolutional code decoder;
   a parallel convolutional code decoder; and
   a controller for selectively processing a convolutionally encoded input signal via at least one of said sequential convolutional code decoder and said parallel convolutional code decoder, said controller determining a signal-to-noise ratio (SNR) of the convolutionally encoded input signal, processing the convolutionally encoded input signal via said sequential convolutional code decoder if the SNR is above a SNR threshold, processing the convolutionally encoded input signal via said parallel convolutional code decoder if the SNR is below the SNR threshold, and determining the SNR threshold based upon at least on of a modulation type and code rate of the convolutionally encoded input signal.

2. The decoding device according to claim 1 wherein said sequential convolutional code decoder comprises a Fano decoder.

3. The decoding device according to claim 1 wherein said parallel convolutional code decoder comprises a Viterbi decoder.

4. The decoding device according to claim 1 wherein said sequential convolutional code decoder has a first constraint length, and said parallel convolutional code decoder has a second constraint length equal to said first constraint length.

5. The decoding device according to claim 4 wherein each of the first and second constraint lengths is less than about 10.

6. An electronic device comprising:
   a wireless receiver for receiving a convolutionally encoded input signal;
   a sequential convolutional code decoder;
   a parallel convolutional code decoder; and
   a controller determining a signal-to-noise ratio (SNR) of the convolutionally encoded input signal, processing the convolutionally encoded input signal via said sequential convolutional code decoder if the SNR is above a threshold, processing the convolutionally encoded input signal via said parallel convolutional code decoder if the SNR is below the SNR threshold, and determining the SNR threshold based upon at least one of a modulation type and code rate of the convolutionally encoded input signal.

7. The electronic device according to claim 6 wherein said sequential convolutional code decoder comprises a Fano decoder.

8. The electronic device according to claim 6 wherein said parallel convolutional code decoder comprises a Viterbi decoder.

9. The electronic device according to claim 6 wherein said sequential convolutional code decoder has a first constraint length, and said parallel convolutional code decoder has a second constraint length equal to said first constraint length.

10. The electronic device according to claim 9 wherein each of the first and second constraint lengths is less than about 10.

11. A method of decoding a convolutionally encoded input signal using a decoding device comprising a sequential convolutional code decoder, a parallel convolutional code decoder, and a controller connected to the sequential convolutional code decoder and the parallel convolutional code decoder, the method comprising:
    operating the controller to selectively process the convolutionally encoded input signal via at least one of the sequential convolutional code decoder and the parallel convolutional code decoder;
    wherein the controller determines a signal-to-noise ratio (SNR) of the convolutionally encoded input signal, processes the convolutionally encoded input signal via the sequential convolutional code decoder if the SNR is above an SNR threshold, processes the convolutionally encoded input signal via the parallel convolutional code decoder if the SNR is below the SNR threshold, and determines the SNR threshold based upon at least one of a modulation type and code rate of the convolutionally encoded input signal.

12. The method according to claim 11 wherein the sequential convolutional code decoder comprises a Fano decoder; and wherein the parallel convolutional code decoder comprises a Viterbi decoder.

13. The method according to claim 11 wherein the sequential convolutional code decoder has a first constraint length, and the parallel convolutional code decoder has a second constraint length equal to the first constraint length; and wherein each of the first and second constraint lengths is less than about 10.

* * * * *